/ Patented July 10, 1962

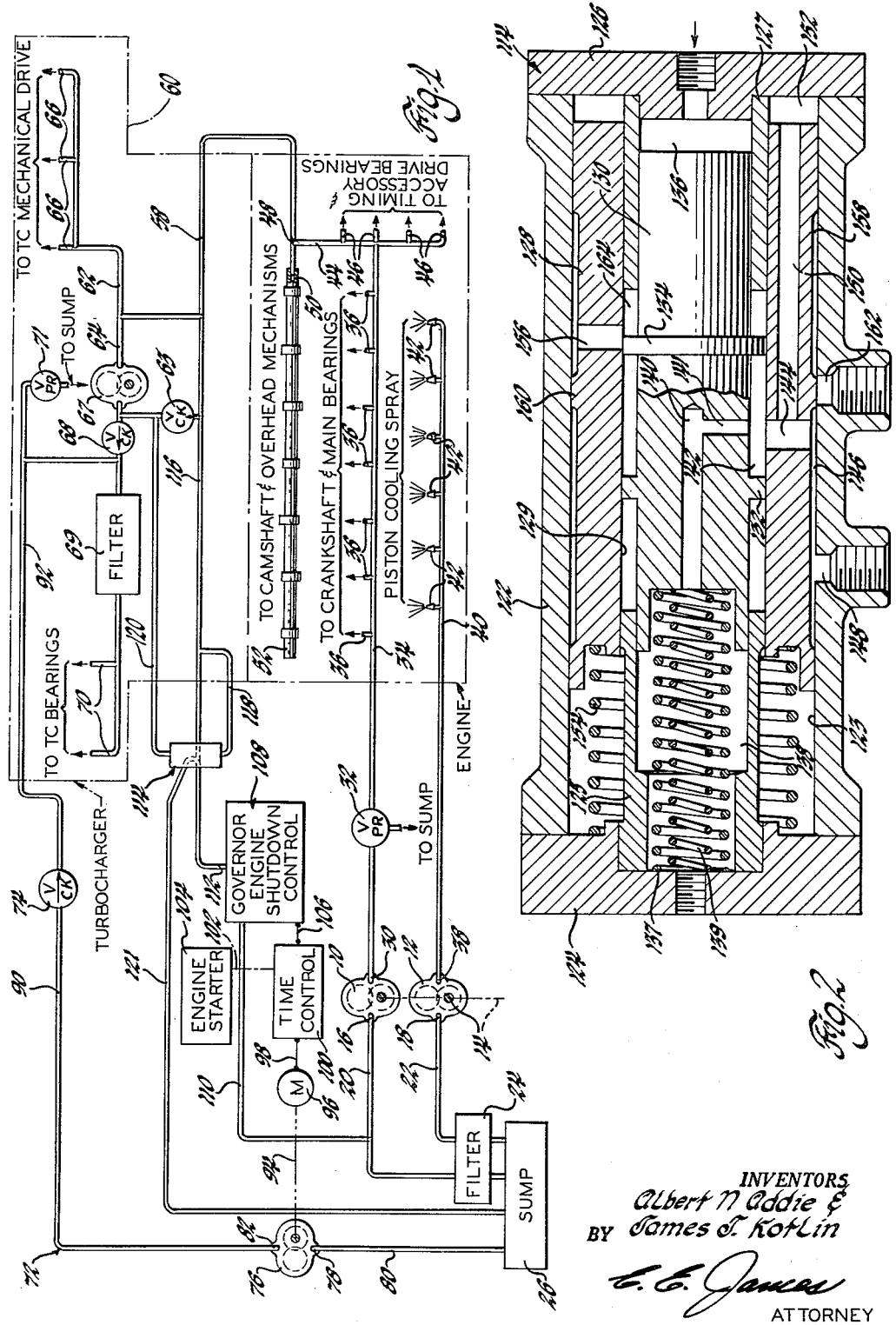

3,043,092
LUBRICATION SYSTEMS AND PROTECTIVE CONTROLS FOR TURBOCHARGED ENGINES
Albert N. Addie, La Grange Park, and James J. Kotlin, Downers Grove, Ill., assignors to General Motors Corporation, Detroit, Mich., a corporation of Delaware
Filed May 18, 1961, Ser. No. 110,969
8 Claims. (Cl. 60—13)

This invention relates generally to an internal combustion engine, and more particularly to a lubrication and protective control system for a turbocharged engine.

The invention has particular application to the turbocharging of a compression ignition engine of a size to provide continuous locomotive, marine and industrial power requirements. Relatively high mechanical and thermal loads are imposed on the various load carrying and combustion chamber defining components of such a turbocharged engine. To provide requisite operational durability, such load factors often dictate the redesign of various components of the previously non-turbocharged engine and require the maintenance of adequate pressurized oil supply for both lubrication and cooling purposes.

The invention contemplates an improved lubrication system for a turbocharged engine of the type indicated including several pumps separately supplying oil for engine and turbocharger lubrication and for piston cooling purposes and related engine shutdown effecting protective controls operable in response to differential pressures in the several oil supply systems to insure the maintenance of adequate oil supplies for both engine and turbocharger lubrication and cooling under all engine operating conditions.

The foregoing and other objects, advantages and features of the invention will be more thoroughly understood from the following description of a preferred illustrative embodiment thereof, having reference to the accompanying drawing, in which:

FIGURE 1 is a diagrammatic view of an engine lubricating and engine protective control system constructed in accordance with the invention; and FIGURE 2 is a sectional view of a differential pressure modulated valve operable to effect an engine shutdown effecting control condition in response to a low oil pressure signal in any of the several oil supply systems.

As shown diagrammatically in FIGURE 1, the engine and turbocharger lubrication system includes two gear pumps 10 and 12 having a common engine driven impeller shaft 14. These pumps respectively supply pressurized oil to separate engine lubrication and piston cooling supply systems. The pumps 10 and 12 have suction or intake ports 16 and 18 connected through conduits 20 and 22 with a high capacity oil filter device 24 mounted within the engine oil sump 26. The discharge port 30 of the engine oil pump 10 is connected through a pressure regulating relief valve 32 to the main oil distribution gallery of the engine which is indicated at 34. This main gallery is connectable through branch passages indicated at 36 to the crankshaft main bearings and oil supply passages.

The discharge port 38 of the piston cooling oil supply pump 12 is directly connected to a distribution gallery or conduit 40 having a plurality of nozzles 42 associated therewith. These nozzles are adapted to continuously direct a stream or spray of cooling oil into the combustion chamber defining portions of the several engine pistons. Since the pump 12 is directly driven by the engine, the piston cooling effect provided thereby varies substantially in accordance with engine speed.

A timing and accessory drive oil supply gallery 44 intersects the main lubrication supply gallery 34 at its end distal from the pressure supply pump 10. This timing and accessory drive gallery extends vertically of the engine and is connected through branch passages indicated at 46 to the various timing gear and accessory drive bearings. The gallery 44 is suitably connected at its upper end at 48 to the adjacent end of an oil distribution gallery 50 which extends longitudinally of a camshaft 52 and supplies oil for lubrication of the several camshaft bearings and overhead valve mechanisms. The upper end of the timing and accessory drive gallery 44 is also connected through a conduit 58 for oil supply to an engine mounted turbocharger 60.

The turbocharger is preferably of the type shown and described in copending United States patent application Serial No. 776,099 entitled, "Compressor Mechanism for Internal Combustion Engines and the Like," filed November 24, 1958, in the names of Albert N. Addie and Brian M. Gallagher. In such a turbocharger, an alternate mechanical drive is adapted to augment the compressor driving torque of the exhaust gas driven turbine to insure an adequate supply of charging and scavenging air under low speed and power and engine accelerating operating conditions. This mechanical drive is drivingly disconnectable from the turbocharger under higher engine speed and load conditions, being overdriven by the turbine through an overrunning clutch or coupling. Oil distribution branch passages 62 and 64 within the turbocharger are connected to the filtered oil supply conduit 58. The branch passage 62 is connectable as indicated at 66 to the several bearings of the mechanical drive. The branch passage 64 is connected to the inlet port of a second-stage high pressure pump 67 which is driven off the engine accessory drive gear train. The pump 67 supplies high pressure oil through a two-way check valve 68, a high pressure "fine" oil filter 69 and branch connections indicated at 70 to the critical turbine heat exposed bearings of the turbocharger proper. The high oil pressure supplied by the pump 67 is regulated by a suitable pressure relieving valve indicated at 71. A check valve 63 interconnects the engine oil supply conduit 58 with the discharge of the high pressure pump 67 and is operable to bypass this pump to insure some oil supply to the turbocharger bearings if and whenever the turbocharger oil supply drops below the pressure in the conduit 58 for any reason. The filter 69 and the branch connections 70 of the turbocharger are alternatively connectable through the check valve 74 to an auxiliary high pressure oil supply system 72.

The auxiliary oil supply system for the turbocharger is controllable by engine starting and shutdown effecting controls associated with the engine governor and is selectively operable thereby to provide high pressure oil to prelubricate the turbocharger bearings prior to engine starting and for bearing cooling purposes for a limited period of time after engine shutdown. The auxiliary supply system 72 comprises a pump 76 having an inlet port 78 connected by a conduit 80 to the engine oil sump 26 and a discharge port 82 connected through the check valve 74 and interconnecting conduits 90 and 92 to the high pressure connection intermediate the filter 69 and the check valve 68. The pump 76 is drivingly connected as indicated at 94 to an electrical motor 96. The motor 96 is in turn electrically connected at 98 to a time control switch mechanism 100. This switch mechanism is connected at 102 to the engine starting control 104 and at 106 to the engine shutdown control 108 of the engine governor and is selectively operable thereby to energize the auxiliary pump driving motor for a limited period of time sufficient to prelubricate the critical high speed and heat exposed bearings of the turbocharger prior to engine starting and for a second period of time sufficient to prevent destructive soak-back heating of the turbocharger bearings after engine shutdown effecting operation of the governor control. Such prestarting and postshutdown high pressure oil supply is isolated from the main engine oil supply system by the check valve 68 and the high pressure pump 67.

The engine governor and its related shutdown control is preferably of a type similar to that shown and described in copending United States Patent Application Serial No. 112,887 entitled, "Governor Mechanism," filed May 26, 1961, in the name of Lauren L. Johnson. Such a governor mechanism is provided with remote speed setting and engine speed and load regulating servo mechanisms which cooperate to provide constant output load characteristics corresponding to each of the engine speed settings. The engine protective control associated with such a governor is operable to effect engine shutdown in response to either an excessive suction or a low engine oil pressure signal applied thereto.

In the illustrative embodiment of the invention, the suction of the engine oil pump 10 is applied to the engine shutdown effecting control 108 through a conduit 110 connected to the pump intake 20. The remote engine oil pressure supplied to the turbocharger mechanical drive is normally applied to the low oil pressure shutdown control of the governor through a connection 112, a differential pressure modulated valve mechanism 114, and a conduit 116 connected to a turbocharger oil supply conduit 58. The valve mechanism 114 is subjected to the turbocharger oil pressures before and after the high pressure pump 67 as indicated diagrammatically at 118 and 120 and is operable thereby to simulate an engine oil pressure failure by venting the shutdown control connection through a drain connection 121 to the engine sump whenever the engine or turbocharger oil pressures applied thereto are below a pressure modulated differential characteristic insuring adequate lubrication and cooling of the several turbocharger bearings. The valve 114 thus provides a variable shutdown effecting characteristic which is modulated in accordance with variations in oil viscosity and in the speed and load of the engine and turbocharger.

As shown in greater detail in FIGURE 2, the housing of the valve mechanism 114 includes a cylindrical housing member 122 which is closed at its opposite ends by end plate members 124 and 126. The end members 124 and 126 support two sleeve members 125 and 127 extending longitudinally therefrom in spaced concentric relation to the inner bore 123 of the cylindrical housing member 122. The housing member 122 cooperates with the inner sleeves 125 and 127 to reciprocably mount a ported valve sleeve 128. The valve sleeve 128 in turn cooperates with the sleeves 125 and 127 to reciprocably support a shuttle valve member 130. This shuttle valve member is provided with two spaced annular control lands at 132 and 134 which slidably and sealingly engage the inner bore 129 of the valve sleeve 128. The end member 126, the sleeve 127 and the adjacent end of the shuttle valve member 130 define an expansible chamber 136. A similar expansible chamber 138 is defined between the end plate 124, the sleeve 125 and the adjacent end of shuttle valve member. These chambers are connected to the high and low pressure turbocharger oil supply connections 120 and 118, respectively. The high pressure oil thus supplied biases the shuttle valve member to the left as viewed in FIGURE 2. This high pressure biasing action is opposed by the low pressure oil supplied to an expansible chamber 138 and by springs 137 and 139 which are compressively interposed between the opposite end of the valve member and the cover member 125.

The low pressure expansible chamber 138 is connected through a longitudinal passage 140 in the valve member and an orifice or restriction at 141 extending radially therefrom to an annular chamber 142 defined between the valve and sleeve members and the valve seal lands 132 and 134. The engine oil pressure thus supplied to the chamber 142 is normally supplied to the governor shutdown control line 112 through a connection including a radial port 144 in the sleeve member 128, an annular chamber 146 defined between the valve sleeve and the cylindrical housing member, and a shutdown outlet port 148 provided in the cylindrical housing member. The engine supply pressure in the annular chamber 142 is also supplied through a passage 150 extending longitudinally of the valve sleeve member to an expansible chamber 152 defined between the housing members 122 and 126, the sleeve 127 and the adjacent end of the valve sleeve member. The engine oil pressure thus applied to the sleeve member 122 is opposed by a spring 154 compressively interposed between the opposite end of the valve sleeve member and the end housing member 124. A drain or vent port 156 extends radially through the valve sleeve 128 in longitudinally spaced relation to the port 144 and communicates outwardly with a second annular chamber 158 defined between the valve sleeve and the cylindrical housing member. The annular chambers 146 and 158 are separated by a seal land or boss 160 and are alternatively connectable to a vent or drain port 162 in the valve housing member in accordance with the pressure responsive positioning of the port sleeve 128. The drain port 162 is connected through the conduit 121 to engine oil sump 26.

With the instant control valve 114, the governor shutdown control 108 is preferably set to effect engine shutdown when the engine oil pressure applied thereto drops belows the minimum level necessary for adequate engine lubrication and under idle speed and load conditions. As engine oil pressure approaches this minimum level, the spring 154 shifts the valve sleeve to the right interconnecting the annular chamber 146 and the drain port 162 thus venting the shutdown control line 112 to effect engine shutdown. Normal idle speed oil supply conditions shift the sleeve and valve member to the positions shown in FIGURE 2. Under such oil supply pressure conditions, the seal land 134 of the valve member closes the sleeve drain port 156 and the seal land 160 of the sleeve closes the vent or drain port 162 with respect to the chamber 146 and opens this drain port with respect to the chamber 158. The selected deflection rates of the springs 137, 139 and 154 are such that the shuttle valve member and valve sleeve tend to maintain this relationship, or to advance the valve member slightly ahead of the valve sleeve, with normal increases in the oil supply pressures applied thereto with increasing engine speed up to the limits provided by the pressure regulating relief valves 32 and 71. The positional relationship thus obtained between the valve and sleeve members for any instantaneous pressure supply condition is indicative of an effective pressure differential acting therebetween. For any given pressure supply condition, this effective pressure differential is substantially equal to the differential pressures biasing the valve member 130 against the springs 137 and 139 minus the lower pressure biasing the sleeve member 128 against the spring 154.

The sleeve ports 144 and 156 and the seal lands 132 and 134 of the valve member are so spaced that a low pressure supply failure is simulated by operation of the shutdown control valve whenever the differential pressure applied to the valve member 130 drops below a scheduled relationship established by the low pressure responsive movement of the valve sleeve 128. In simulating a low pressure supply failure in response to an excessive drop in high pressure supply, the valve member 130 is shifted to the right until the sleeve ports 144 and 156 are interconnected through the valve chamber 142. Since oil flow from the engine supply to the chamber 142 is restricted by the orifice 141, the relatively unrestricted connection provided by the chamber 142 between the shutdown and drain connections 112 and 164 rapidly vents the control pressure below the minimum shutdown effecting level. This rapid reduction of pressure in the control line also permits the spring 154 to shift the sleeve 128 rapidly to the right until the seal land 160 opens the housing drain port 162 thereby directly connecting the shutdown control line through the chamber 146 to the drain line.

The valve 114 is similarly operable to simulate a low pressure supply failure should there be an excessive drop or failure in the low pressure supply or an excessive increase in either supply pressure. Such an excessive pressure increase might occur due to blocking or restriction of the turbocharger oil supply lines or passages. If the engine supply pressure increases beyond that indicated by the high pressure supply, the resultant relative movement between the valve and sleeve members serves to rapidly vent the shutdown control pressure as the seal land 134 opens the sleeve port 156. Should an excessive drop or failure occur in the low pressure oil supply, the valve sleeve 128 is shifted to the right by the spring 154 against the reduced pressure in the chamber 152 and the remaining high pressure oil supply in the chamber 156 shifts the shuttle valve carrying the seal land 132 toward end abutment with the stop sleeve 125. Such relative movement between the valve and sleeve members carries the seal land 134 beyond the sleeve port 144 thus venting the shutdown control pressure to the drain line through a chamber 164 defined between the stop sleeve 127 and the seal land 134. A similar low oil pressure simulating connection may be effected by an excessive increase in the high pressure supply.

From the foregoing description, it will be seen that the lubrication and protective control system of the invention insures adequate prelubrication of the critical turbocharger bearings prior to engine starting; insures adequate oil supply pressures for proper engine lubrication, for turbocharger lubrication and cooling, and for piston cooling purposes under all engine speed and load operating conditions; and automatically provides adequate cooling oil to prevent soak-back heating of the critical turbocharger bearings for a timed period subsequent and in response to operation of the engine shutdown effecting control.

While the invention has been shown and described with reference to a single illustrative embodiment, it will be apparent that various changes and departures might be made therefrom without departing from the spirit and scope of the invention as defined in the following claims.

We claim:

1. In an internal combustion engine having an exhaust gas driven turbocharger, engine control means operable to effect engine shutdown in response to oil pressure below a predetermined minimum, a first means operable to supply pressurized oil for engine lubrication including a first engine driven pump means and passage means for distributing pressurized oil to the several engine and accessory bearings, a second means connected in series with said first pressure supply passage means and operable to pressurize further the oil supplied thereto for lubrication and cooling of the turbocharger, said second pressure supply means including a second engine driven pump means and passage means for distributing the high pressure oil from said second pump means to the several turbocharger bearings, a first valve means operable to prevent reverse fluid flow from said turbocharger bearings toward said second pressure supply means, a second valve means intermediate said first and second passage means and operable to bypass said second pump means when the oil pressure of said turbocharger supply is below that of said engine oil supply and to prevent reverse flow therethrough when said turbocharger supply pressure is above that of engine supply, a third pressure supply pump means connectable to said turbocharger bearing supply passage means and energizable to supply pressurized oil to the turbocharger bearings independently of engine operation, time control means operably connected to said engine control means and adapted to energize said third pump means for limited prelubrication of the turbocharger bearings prior to engine starting and for turbocharger bearing cooling subsequent to engine shutdown, and differential pressure actuated valve means subjected to said engine and turbocharger supply pressures and normally operable to connect said first supply means to said shutdown control means whenever the differential between said supply pressures is in excess of that required for adequate engine and turbocharger lubrication and alternately operable to vent said shutdown control means thereby effecting engine shutdown whenever said pressure differential is below that required for adequate engine and turbocharger lubrication.

2. A lubrication and protective control system for an internal combustion engine power plant including an exhaust gas driven turbocharger, said system comprising an engine control means operable to initiate and maintain engine operation and including pressure responsive means operable to effect engine shutdown in response to an oil pressure signal supplied thereto below a predetermined minimum pressure, a first means operable to supply pressurized oil for engine lubrication, a second means connected in series with said first pressure supply means and operable to pressurize further the oil supplied thereto for lubrication and cooling of the turbine and compressor mounting bearings of the turbocharger, a first check valve means operable to prevent reverse fluid flow from said turbocharger bearings toward said first and second pressure supply means, a third pressure supply means connectable to said turbocharger bearings through a second check valve means and energizable to supply pressurized oil to the turbocharger bearings independently of engine operation, time control means operable by said engine control means to energize said third pressure supply means for limited periods of time for prelubrication of the turbocharger bearings prior to engine starting and for bearing cooling purposes subsequent to engine shutdown, and valve means subjected to the pressures of said first and second pressure supply means and normally operable to connect said first means to said shutdown control means whenever the differential between said first and second supply pressures is in excess of that required for adequate engine and turbocharger lubrication and alternately operable to vent said shutdown control means thereby effecting engine shutdown whenever said pressure differential is below that required for adequate engine and turbocharger lubrication.

3. In an internal combustion engine having an exhaust gas driven turbocharger, an engine control means operable to initiate and maintain engine operation, a pressure responsive means operable to effect engine shutdown in response to an oil pressure signal below a minimum pressure, a first means operable to supply pressurized oil for engine lubrication, a second means operable to supply pressurized oil for lubrication and cooling of the turbocharger, a first check valve means operable to prevent reverse fluid flow from said turbocharger toward said second pressure supply means, a third pressure supply means connectable to said turbocharger through a second check valve means and energizable to supply pressurized oil to the turbocharger bearings independently of engine operation, time control means operably associated with said engine control means and adapted to energize said third means for limited prelubrication of the turbocharger prior to engine starting and for turbocharger cooling subsequent to engine shutdown, and valve means subjected to the differential pressures of said first and second pressure supply means and normally operable to connect said first means to said shutdown control means whenever the differential between said supply pressures is in excess of that required for adequate engine and turbocharger lubrication and alternately operable to vent said shutdown control means thereby effecting engine shutdown whenever said pressure differential is below that required for adequate engine and turbocharger lubrication.

4. In an internal combustion engine having an exhaust gas driven turbocharger, an engine control means operable to initiate and maintain engine operation and to effect engine shutdown, a first means operable to supply pressurized oil for engine lubrication including a first engine driven pump means and passage means for distributing the pressurized oil to the several engine and accessory bearings, a second means in series with said first pressure supply passage means and operable to pressurize further the oil supplied thereto for lubrication and cooling of the turbocharger, said second pressure supply means including a second engine driven pump means and passage means for distributing the high pressure oil from said second pump means to the several turbocharger bearings, a first valve means operable to prevent reverse fluid flow from said turbocharger bearings toward said second pressure supply means, a second valve means intermediate said first and second passage means and operable to bypass said second pump means when the oil pressure of said turbocharger supply is below that of said engine oil supply and to prevent reverse flow therethrough between said turbocharger supply pressure is above that of the engine supply, a third pressure supply pump means connectable to said turbocharger bearing supply passage means and energizable to supply pressurized oil to the turbocharger bearings independently of engine operation, and time control means operably connected to said engine control means and adapted to energize said third pump means for limited lubrication of the turbocharger bearings prior to engine starting and for cooling subsequent to engine shutdown.

5. In an internal combustion engine having an exhaust gas driven turbocharger, engine control means operable to effect engine shutdown in response to oil pressure below a predetermined minimum, a first means operable to supply pressurized oil for engine lubrication including a first engine driven pump means and passage means for distributing pressurized oil from said first pump means to the several engine and accessory bearings, a second means in series with said first pressure supply passage means and operable to supply further pressurized oil for lubrication and cooling of the turbocharger, said second pressure supply means including a second engine driven pump means and passage means for distributing the high pressure oil from said second pump means to the several turbocharger bearings, a first valve means operable to prevent reverse fluid flow from said turbocharger bearings toward said second pressure supply means, a second valve means intermediate said first and second passage means and operable to bypass said second pump when the oil pressure of said turbocharger supply is below that of said engine oil supply and to prevent reverse flow therethrough between said turbocharger supply pressure is above that of the engine supply, and a third valve means subjected to said engine and turbocharger supply pressures and normally operable thereby to connect said first supply means to said shutdown control means whenever the differential between said supply pressures is sufficient to insure adequate engine and turbocharger lubrication and alternately operable to vent said shutdown control means thereby effecting engine shutdown whenever said pressure differential is below that required for adequate engine and turbocharger lubrication.

6. In an internal combustion engine having an exhaust gas driven turbocharger, a first engine driven pump means operable to supply pressurized oil for engine lubrication, a first passage means for distributing pressurized oil from said first pump means to the several engine and accessory bearings, a second engine driven pump means connected in series with said first passage means and operable to supply further pressurized oil for lubrication and cooling of the turbocharger, second passage means for distributing high pressure oil from said second pump means to the several turbocharger bearings, a first valve means operable to prevent reverse fluid flow from said turbocharger bearings toward said second pressure supply means, an engine control means operable to effect engine shutdown in response to oil pressure below a predetermined minimum, and a second valve means subjected to said engine and turbocharger supply pressures and normally operable thereby to connect said first supply means to said shutdown control means whenever the differential between said supply pressures is sufficient for adequate engine and turbocharger lubrication and alternately operable to vent said shutdown control means thereby effecting engine shutdown whenever said pressure differential is below that required for adequate engine and turbocharger lubrication.

7. In an internal combustion engine power plant including an exhaust gas driven turbocharger, a lubrication and protective control system comprising pressure responsive means operable to effect engine shutdown in response to an oil pressure signal below a predetermined minimum pressure, a first means operable to supply pressurized oil for engine lubrication, a second means in series with said first pressure supply means and operable to further pressurize the oil supplied thereto for lubrication and cooling of the turbocharger, and differential pressure actuated valve means intermediate said first pressure supply means and said pressure responsive shutdown control means, said valve means being subjected to the differential pressures of said first and second pressure supply means and normally operable to connect said first pressure supply means to said pressure responsive shutdown control means whenever the pressure differential between said engine and turbocharger lubrication supply pressures is in excess of that required for adequate engine and turbocharger lubrication, said valve means being alternately operable to vent said pressure responsive shutdown control means thereby effecting engine shutdown whenever said pressure differential is below that required for adequate engine and turbocharger lubrication.

8. In an internal combustion engine power plant including an exhaust gas driven turbocharger, pressure responsive means operable to effect engine shutdown in response to an oil pressure signal below a predetermined minimum pressure, a first means for supplying pressurized oil for engine lubrication, a second means for supplying pressurized oil for lubrication and cooling of the turbocharger, and differential pressure actuated valve means intermediate said first pressure supply means and said pressure responsive shutdown control means, said valve means being subjected to the differential pressures of said first and second pressure supply means and normally operable to connect said first pressure supply means to said pressure responsive shutdown control means whenever the pressure differential between said engine and turbocharger lubrication supply pressures is in excess of that required for adequate engine and turbocharger lubrication, said valve means being alternately operable to vent said pressure responsive shutdown control means thereby effecting engine shutdown whenever said pressure differential is below that required for adequate engine and turbocharger lubrication.

No references cited.